UNITED STATES PATENT OFFICE.

GEORGE P. LEHRITTER, OF FREEHOLD, NEW JERSEY.

CONDENSED MOLLUSCOUS FOOD PREPARATION AND PROCESS OF MAKING SAME.

1,155,743.  Specification of Letters Patent.  Patented Oct. 5, 1915.

No Drawing.  Application filed October 13, 1913. Serial No. 794,782.

*To all whom it may concern:*

Be it known that I, GEORGE P. LEHRITTER, a citizen of the United States, and a resident of Freehold, in the county of Monmouth, State of New Jersey, United States of America, have invented certain new and useful Improvements in Condensed Molluscous Food Preparations and Processes of Making Same, of which the following is a specification.

My invention relates to a food preparation in condensed form and the process of making it, and its object is to provide a preparation of clams or oysters or the like, in a form which will keep indefinitely and from which a healthful and nutritious bouillon or broth may be made readily by the simple addition of hot water.

I will describe my invention in the following specification and point out the novel features thereof in appended claims.

In preparing my invention from clams, for example, the clams are opened and ground up and in their own liquor are subjected to heat below the boiling point for at least a half hour. This may be conveniently done by placing the vessel which contains this material in a hot water or steam bath. This part of the process is continued until the material is thoroughly extracted or digested. The solid matter is then removed by straining, preferably under pressure, leaving the extract in liquid form. To every pint of this liquid extract is added one ounce of a sodium salt—preferably the chlorid, and one half ounce of Bermuda arrow-root. The first of these elements serves to flavor the material and also acts as a preservative. The other element is used as a gelatinizing agent and detracts nothing from the natural flavor of the extract. This material is then thoroughly sterilized by boiling and the boiling is continued until the product is reduced to the desired consistency. This consistency may be either that of a heavy thick liquid or that of a jelly. I prefer to boil it until the mass is about one quarter as great as at the beginning of the boiling. To the preparation thus obtained may be added, if desired, one tenth of one per cent. of sodium benzoate, and also a small quantity of flavoring matter such for example as about one per cent. of extract of celery or celery salt.

The material prepared as above is in concentrated form and may be kept indefinitely in convenient jars. In use, a dessert-spoonful of the preparation is placed in a cup and hot water added which will form a delicious clam broth. To the broth thus made, may be added a little cream and a small lump of butter if a richer broth is desired. When the flavoring matter is omitted during the process of manufacturing this preparation, it may be added to the cup.

I have described the process of manufacturing my novel preparation, when clams are used as a basis for the extract, and shall claim it in the same way. But it is to be understood that oysters may be treated in the same way and so may scallops and other molluscous foods. I therefore intend that the expression clam-extract in the claims is broad enough to cover any other similar molluscous food extract.

What I claim is:

1. A food jelly comprising a large proportion of clam extract from which the solid matter has been removed, a small proportion of sodium chlorid as a preservative and a small proportion of arrow-root as a coagulating agent, sterilized and condensed to a jelly.

2. A food jelly comprising thirty-two parts of a digested clam extract from which the solid matter has been removed, two parts of sodium chlorid as a preservative and one part of arrow-root as a coagulating agent, said parts being sterilized and condensed by boiling.

3. The herein described process of making a food preparation which consists in grinding clams in their own liquor, digesting the resultant material by subjecting it to heat below the boiling point, removing the solid matter therefrom, adding a preservative salt and a coagulating agent, and sterilizing and condensing the mixture thus obtained by boiling it until it has a jelly-like consistency.

In witness whereof, I have hereunto set my hand this 11th day of October 1913.

GEORGE P. LEHRITTER.

Witnesses:
F. GRAVES,
G. R. QUIMBY.